E. LEGLER.
ICING MACHINE.
APPLICATION FILED APR. 27, 1914.

1,164,944.

Patented Dec. 21, 1915.
7 SHEETS—SHEET 1.

WITNESSES:
Frank R Glove
H.C. Rodgers

INVENTOR
Edward Legler
BY
George F Thorpe
ATTORNEY

E. LEGLER.
ICING MACHINE.
APPLICATION FILED APR. 27, 1914.

1,164,944.

Patented Dec. 21, 1915.
7 SHEETS—SHEET 2.

WITNESSES:
Frank R Gore
H.C. Rodgers

INVENTOR
Edward Legler
BY
George H Thorpe
ATTORNEY

E. LEGLER.
ICING MACHINE.
APPLICATION FILED APR. 27, 1914.
1,164,944.
Patented Dec. 21, 1915.
7 SHEETS—SHEET 3.
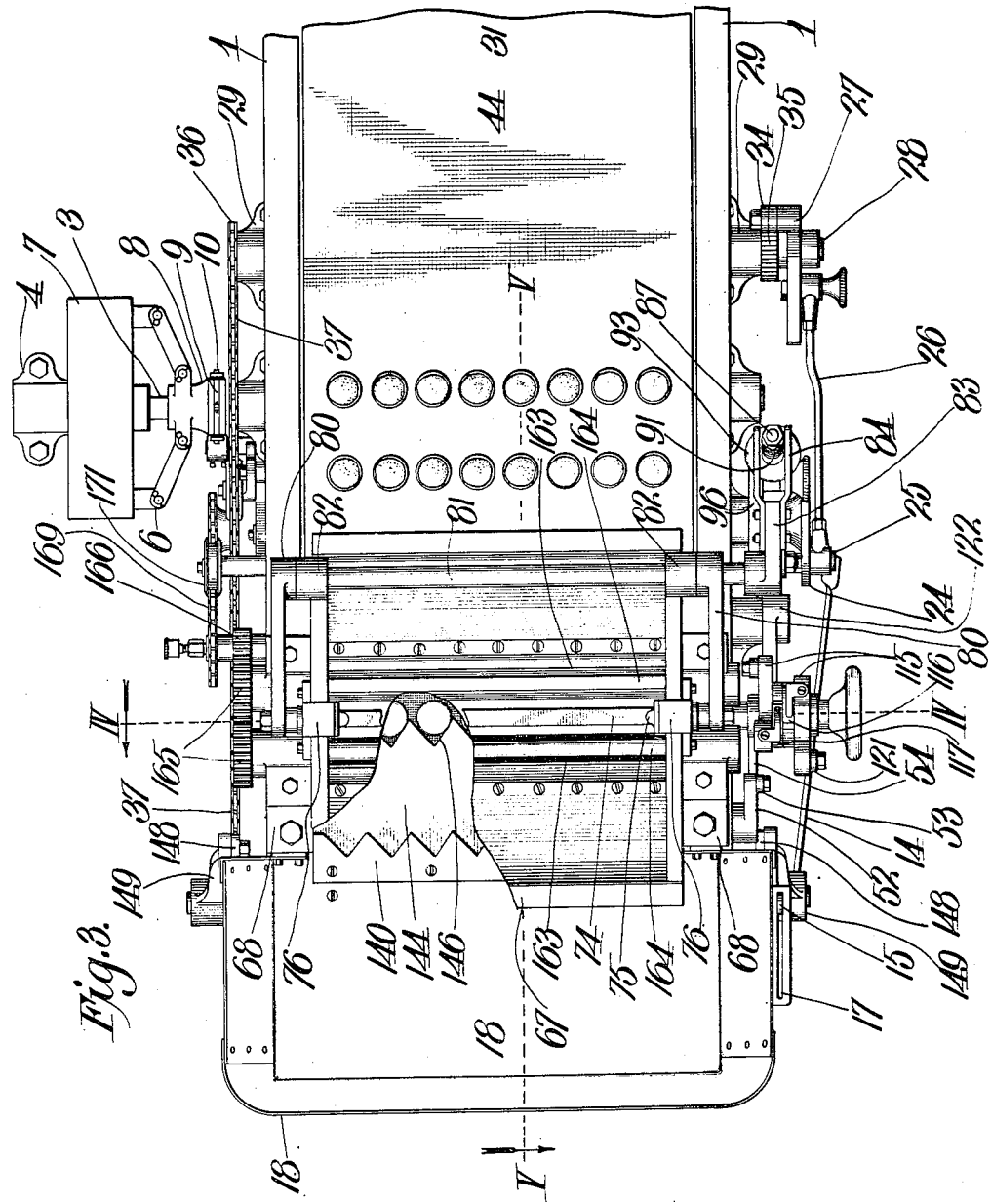
WITNESSES:
Frank R. Howe
H. C. Rodgers.
INVENTOR
Edward Legler
BY
George F. Thorpe
ATTORNEY

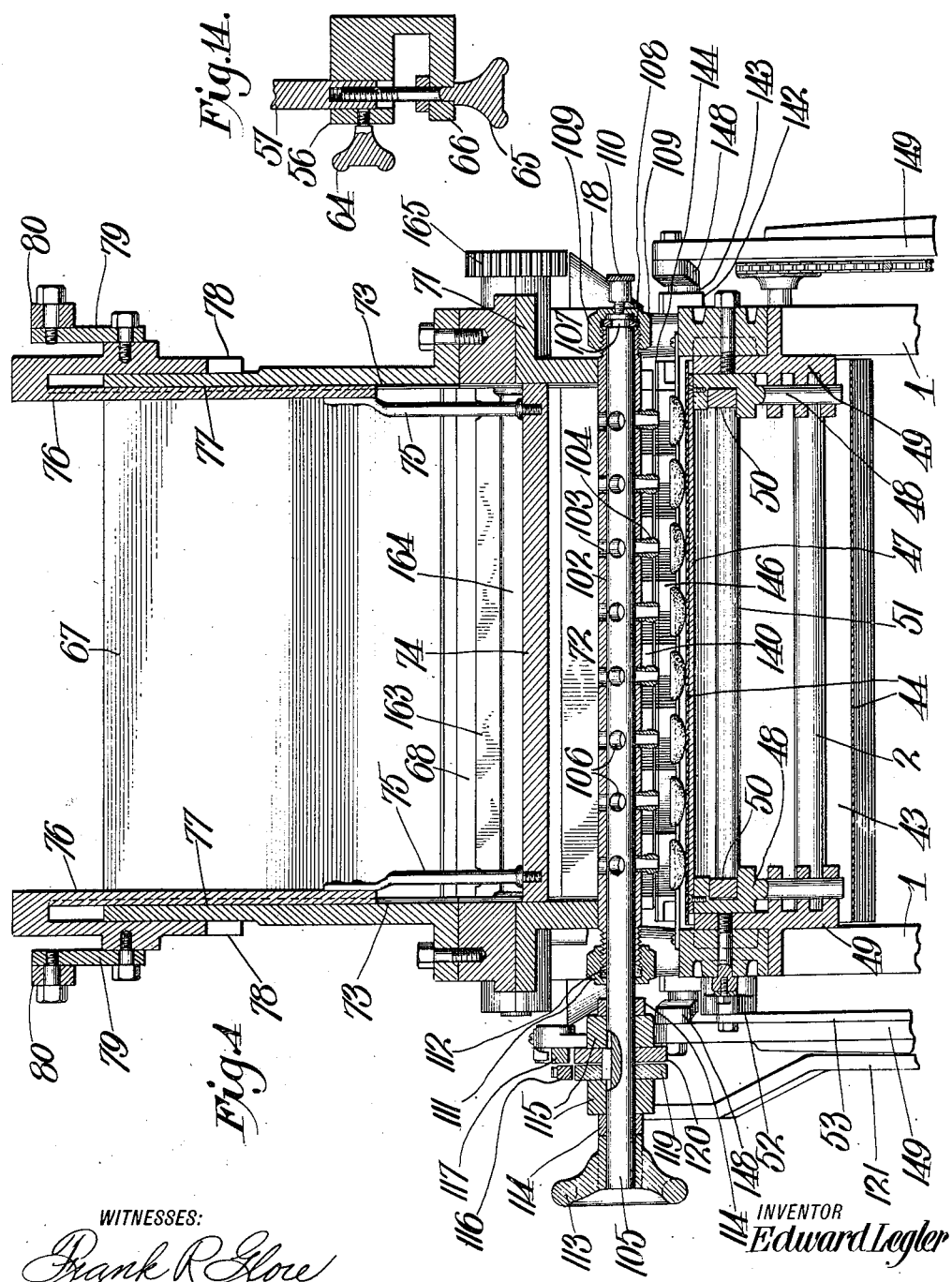

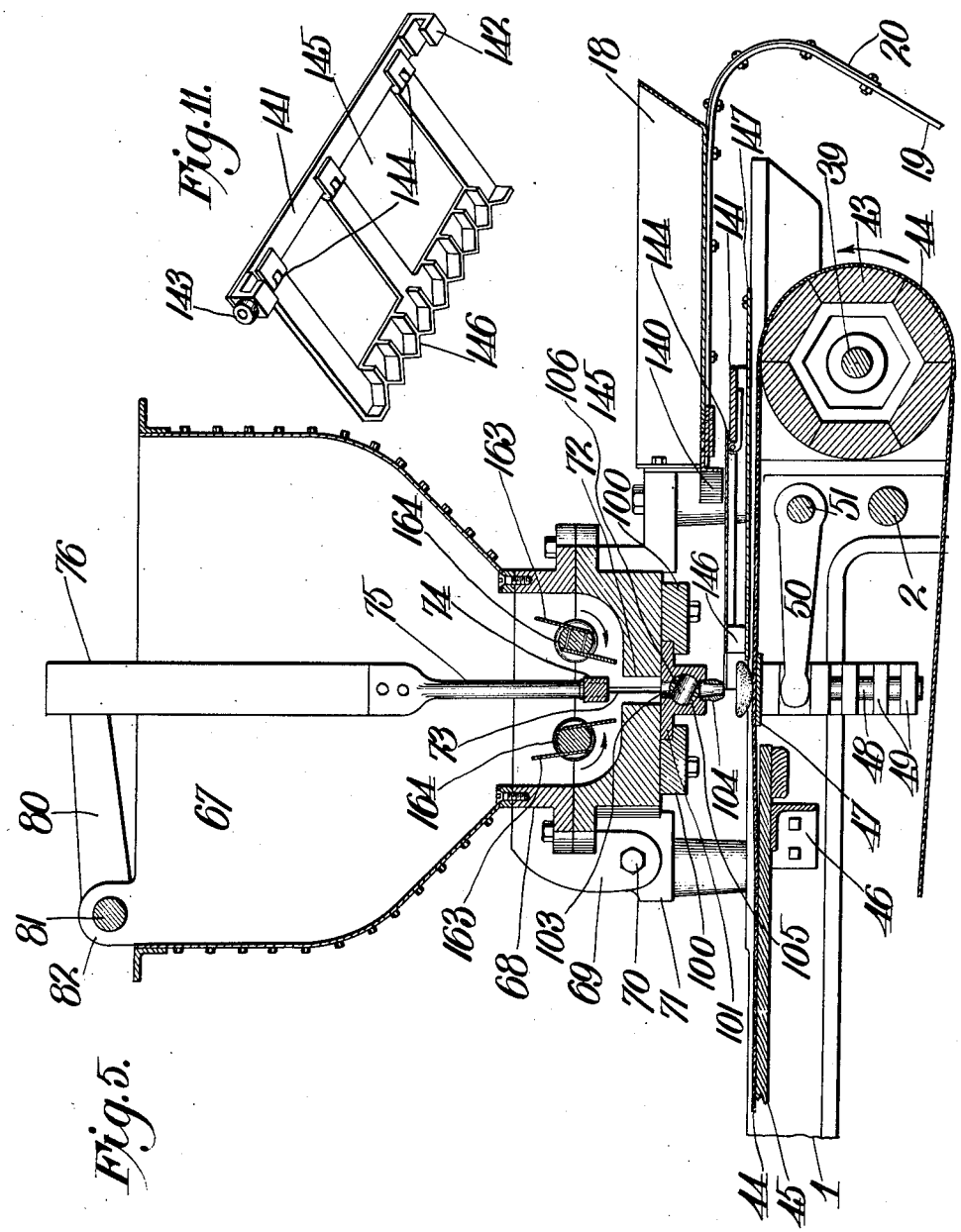

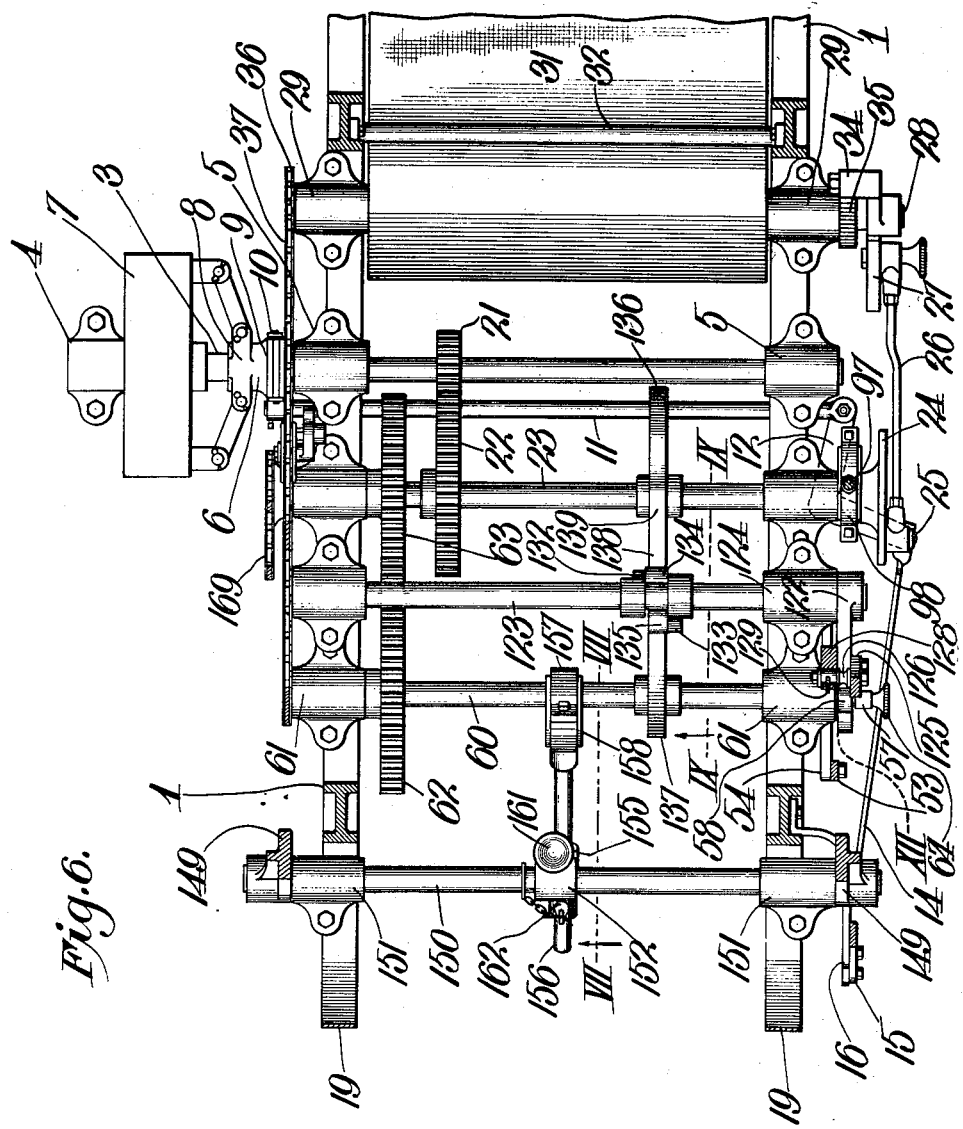

E. LEGLER.
ICING MACHINE.
APPLICATION FILED APR. 27, 1914.
1,164,944.
Patented Dec. 21, 1915.
7 SHEETS—SHEET 7.
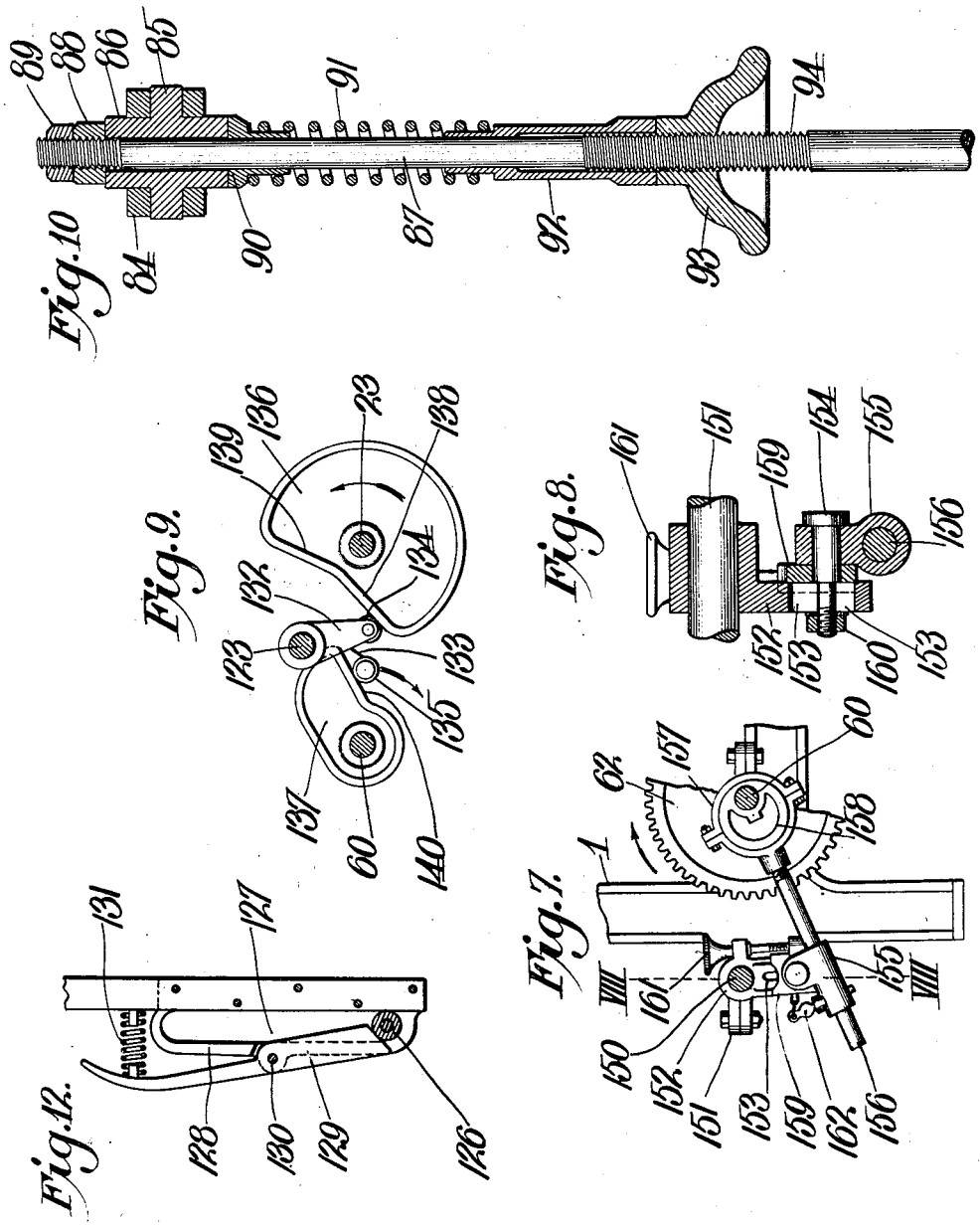
WITNESSES:
INVENTOR
Edward Legler
BY
ATTORNEY

UNITED STATES PATENT OFFICE.

EDWARD LEGLER, OF KANSAS CITY, KANSAS.

ICING-MACHINE.

1,164,944. Specification of Letters Patent. Patented Dec. 21, 1915.

Application filed April 27, 1914. Serial No. 834,715.

*To all whom it may concern:*

Be it known that I, EDWARD LEGLER, a citizen of the United States, residing at Kansas City, in the county of Wyandotte and State of Kansas, have invented certain new and useful Improvements in Icing-Machines, of which the following is a specification.

This invention relates to icing machines and more particularly to machines for depositing marshmallow upon cakes in quick succession and in uniform quantity and shape.

Figures 1, 13:
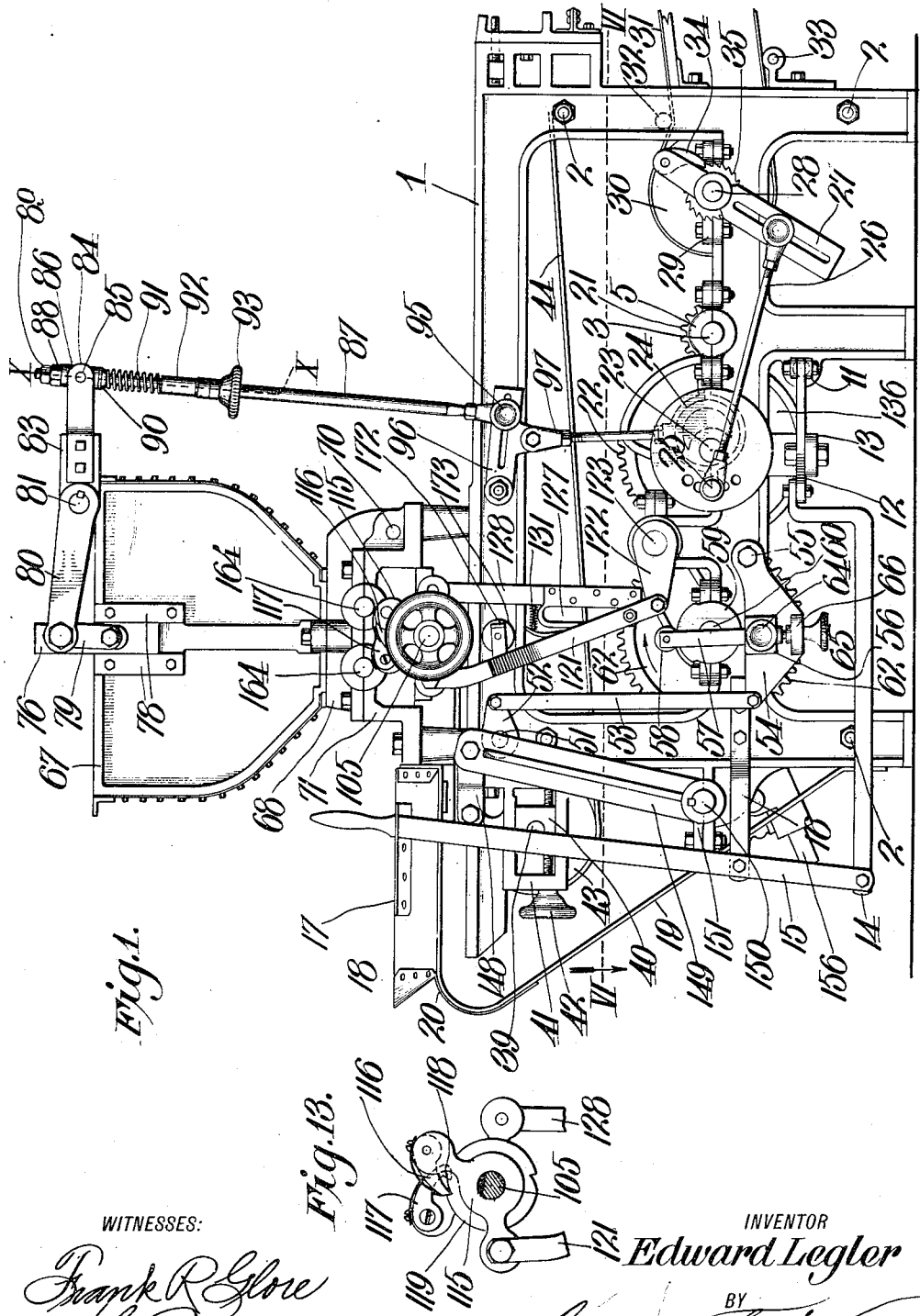
Figure 2:
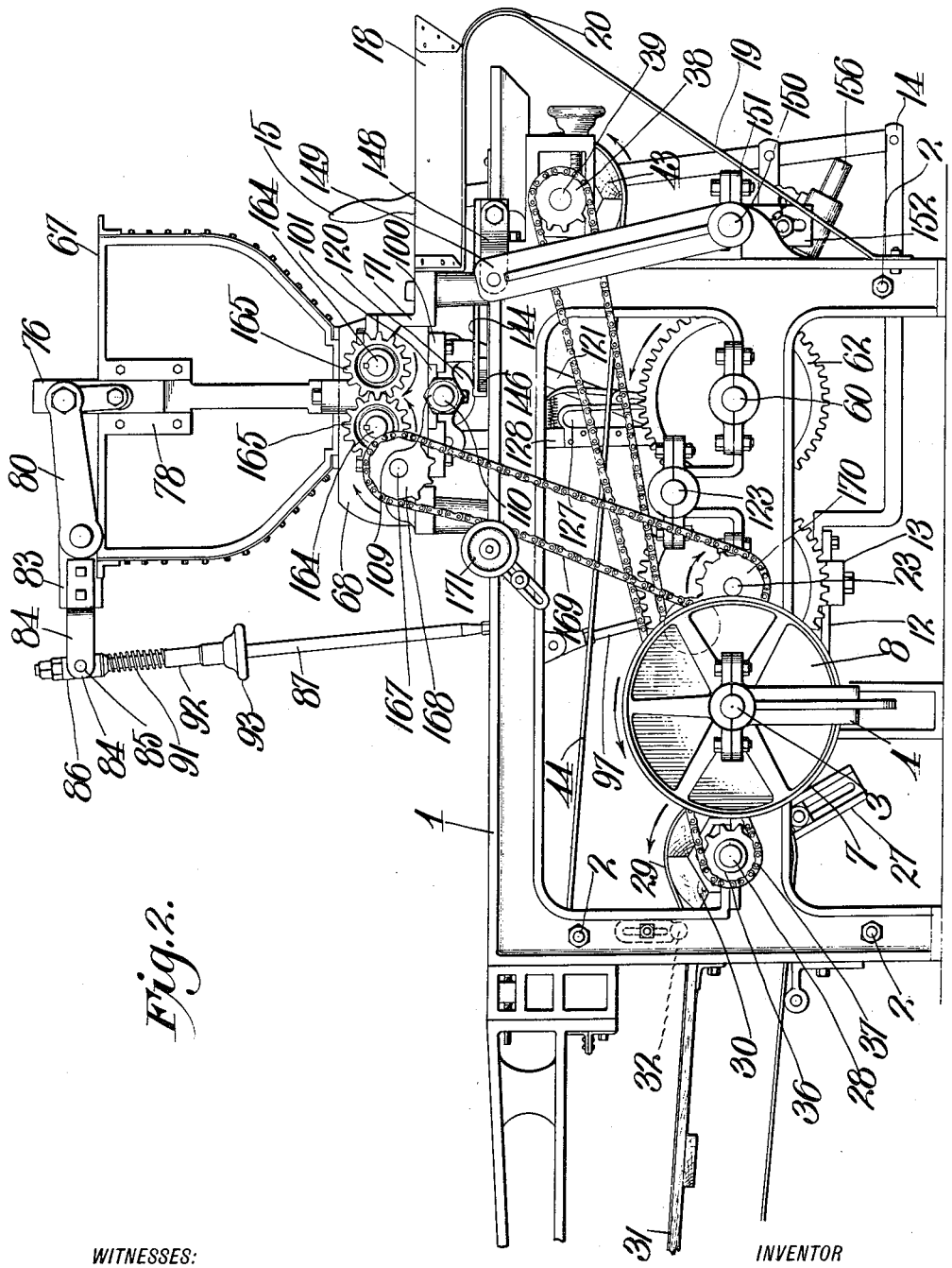

With this general object in view the invention consists in certain novel and peculiar features of construction and organization as hereinafter described and claimed, and in order that it may be fully understood reference is to be had to the accompanying drawings in which:

Figure 1, is a view of one side of an icing machine embodying my invention. Fig. 2, is a view of the other side of the machine. Fig. 3, is a top plan view, partly broken away. Fig. 4, is an enlarged central vertical section taken on the line IV—IV of Fig. 3. Fig. 5, is a vertical longitudinal section taken on the line V—V of Fig. 3, and on the same scale as Fig. 4. Fig. 6, is a horizontal section taken on the line VI—VI of Fig. 1. Fig. 7, is a vertical section on the line VII—VII of Fig. 6. Fig. 8, is a vertical section on the line VIII—VIII of Fig. 7. Fig. 9, is a vertical section on the line IX—IX of Fig. 6. Fig. 10, is an enlarged vertical section on the line X—X of Fig. 1. Fig. 11, is a detailed perspective view of the cake placer. Fig. 12, is a vertical section on the dotted line XII of Fig. 6. Fig. 13, is a vertical section taken through the valve to show more clearly the pawl and ratchet mechanism for effecting operation of said valve. Fig. 14, is a vertical section showing the association of certain parts whereby to accommodate the machine to operation with cakes of different thickness.

In the said drawings where like reference characters identify corresponding parts in all of the figures, 1 is a skeleton frame resting upon the floor of a room, the sides of the frame being connected together by cross rods or bolts 2. A transverse shaft 3 is journaled in a suitable bearing 4 and bearings 5, and mounted on the shaft between bearing 4 and the adjacent bearing 5 is a clutch mechanism 6 and a belt wheel 7, the collar 8 of the clutch mechanism being arranged as usual to rotate with and slide upon the shaft, and said collar is provided with the customary ring 9 and pivoted to the ring is the usual fork lever 10 connected by a cross rod 11 with a bell crank 12, mounted for movement in a horizontal plane on a bracket or arm 13, depending from the machine frame, and the opposite end of said lever is connected by a longitudinally extending link 14 to a lever 15 fulcrumed on a support 16, projecting from the machine frame. The lever extends also through a slotted guide 17, secured to one side of a hopper 18 upon which the cakes to be iced are deposited. The hopper 18 is mounted upon supports 19 secured to the machine frame and hopper, and a curved guard 20 depends from the front of the hopper to prevent the operators, who will sit at the front end of the machine and face the same, from sticking their feet sufficiently below the machine to perhaps suffer an injury.

Rigidly mounted on the drive shaft 3 is a gear pinion 21 and said pinion meshes with a gear wheel 22 rigidly secured on a transverse shaft 23 suitably journaled in the frame, and mounted rigidly on the end of said shaft at the opposite side of the machine from the belt wheel, is a disk 24 provided with an adjustable wrist-pin 25, pivotally connected by a link 26 with a lever 27, the connection with the lever being a pin-and-slot connection so that the throw of the lever may be varied. The lever is pivoted on a transverse shaft 28 journaled in bearings 29 and secured on said shaft is a roller 30, over which runs an endless conveyer or apron 31, an antifriction roll 32 being journaled in the frame and engaging the upper side of the conveyer for the purpose of tensioning it, the lower run of the conveyer also resting by preference upon an underlying roller 33, supported from the machine frame.

34 is a pawl pivoted to lever 27 and engaging ratchet wheel 35, rigidly secured on shaft 28 so that with each revolution of shaft 23 the pawl will be caused to rotate shaft 28 and return to its initial position, this operation obviously imparting intermittent travel to the conveyer. Secured on the opposite end of shaft 28 from that equipped with the pawl and ratchet mechanism, is a small sprocket wheel 36 and engaging the same is a sprocket chain 37 leading diagonally upward toward the hopper 18 and engaging a sprocket wheel 38, mounted on a transverse shaft 39, journaled in boxings 40 in longitudinally slotted frames 41, secured to the machine frame, screws 42 journaled in the frames 41, extending through the boxings for the purpose of adjusting the same to tension the chain 37.

43 is a roller secured to shaft 39 and engaging one end of an endless apron or conveyer 44, extending longitudinally through the upper part of the machine, the upper run of the said conveyer occupying a substantially horizontal plane a short distance below the cake hopper 18. In practice the apron or conveyer 44 converges with respect to the conveyer 31 and eventually discharges the iced cakes upon the latter or into trays carried by the latter, in a manner so well known in the art that the conveyers have been broken away to save space and unnecessary illustration, it being of course understood that there will be a roller at each end of each conveyer.

Underlying the upper run of the conveyer from a point a short distance forward of roller 43 is a sustaining table 45 supported by transverse bars 46 secured to the sides of the machine frame, one bar only appearing, and just rearward of said bar is a horizontal lift plate 47 which extends from one side of the frame to the other and engages the underside of the upper run of the conveyer, the ends of said plate being secured upon the upper ends of a pair of vertical grooved pins 48 mounted slidingly in brackets 49, secured to the adjacent sides of the machine frame, as shown most clearly in Fig. 4.

Engaging pins 48 to impart vertical movement to the same is a pair of crank arms 50 projecting forwardly from a rock shaft 51, extending transversely of and journaled in the machine frame, and provided at one end with a forwardly projecting crank arm 52, pivotally connected by a link 53 with a rock arm 54 pivoted at 55 to the machine frame. Rock arm 54 is provided with an outwardly projecting boss 56 wherein fits the lower end of a bar 57 provided with an anti-friction roller 58 at its upper end and resting on a cam wheel 59 secured on a transverse shaft 60, journaled in suitable bearings 61 on the machine frame, and connected by a gear wheel 62 with a gear wheel 63 secured on shaft 23, so that the operation of the latter shall impart rotation to the cam wheel.

Bar 57 is clamped firmly by set screw 64 to boss 56 so that rotation of the cam shall, through the connections described, effect up and down movement of the plate 44 and hence of the superimposed portion of the upper run of the conveyer. To provide means whereby the plane of the belt may be shifted slightly for the purpose of accommodating cakes of different thickness, a set screw 65 is swiveled to an arm 66 of rock arm 55, and screws into the lower end of bar 57, and when it is desired to adjust the lift plate 44 slightly upward or downward, the screw 65 is turned to screw farther into bar 57 or to withdraw a greater distance out of said bar. In the former case the distance between the rock arm 54 and roller 58 is diminished and in the latter case it is increased.

67 is a hopper to contain the icing or marshmallow to be deposited upon the cakes. The lower portion of said hopper consists of a rectangular frame 68 provided with depending hinge arms 69, hinged at 70 to a stationary frame 71 secured upon the machine frame 1, the frame 71 constituting the bottom of the hopper and being provided with a slot 72 extending the full width of the hopper, and at opposite ends of the slot the sides of the hopper are provided with vertical grooves 73 wherein fit the ends of a feed plunger 74, adapted to operate vertically through the slot 72. The feed plunger is secured to the lower ends of a pair of vertical rods 75, secured at their upper ends to reciprocatory U-shaped frames 76 fitting astride the side walls of the hopper, the inner arms of said frames having tongues 77 engaging grooves 73, and the outer arms fitting between vertical plates 78 secured externally to the side walls of the hopper.

To impart reciprocatory movement to said frames 76 and hence to the feed plunger 74, links 79 pivotally connect the outer arms of frame 76 with arms 80 of a rock shaft 81, journaled in lugs 82 projecting upward from the hopper 67, and said shaft 81 is also provided with an outwardly projecting arm 83 to which is secured a pair of arms 84 to provide a fork for pivotally engaging trunnions 85 of a sleeve 86 mounted slidingly on a rod 87, the upper end of the rod being threaded and engaged by a nut 88 which also engages the upper end of the sleeve 86, and a lock nut 89. To hold the sleeve pressed yieldingly upward a collar 90 slidingly mounted on the rod is engaged by a spring 91 encircling the rod and bearing at its lower end upon a sleeve 92 on the rod, and said sleeve is adjustable upward to compress the spring by means of a hand nut 93 engaging a threaded portion 94 of the rod. The lower end of said rod is adjustably pivoted by screw 95 in the slotted rock arm 96 pivoted to the machine frame, and pivoted to the rock arm 96 is a rod 97 secured to the sleeve 98 of an eccentric 99, secured on shaft 23, so that in each complete revolution of said shaft, the feed plunger will make one down or feed stroke and one up or return stroke, it being noticed that the power is transmitted through the spring 91, and is prepared to yield and thus avoid danger of breakage of any part, in the event that an unyielding obstruction is encountered by the plunger in its power stroke. If it is desired to vary the quantity of marshmallow delivered by the hopper under the power of the plunger, the pivotal connection of the rod 87 with rock arm 96, will be varied by adjustment along the slot of said arm, as will be readily understood by reference to Fig. 1.

Secured to the underside of the bottom 71 of the marshmallow hopper and at opposite sides of the vertical plane of the slot 72, is a pair of grooved bars 100, and secured in the grooves of said bars and against the bottom of the hopper is a valve casing 101, the same being provided with a longitudinal bore or passage 102, extending for its full length, and with a series of vertical openings 103 in the upper part of the casing and a corresponding series of discharge nipples 104 depending from the casing in alinement with the openings 103, and journaled in the bore or passage 102 is a cylindrical valve 105, provided with diametric openings 106 in the vertical plane of openings 103 and adapted when the valve is properly adjusted to establish communication between openings 103 and the underlying discharge nipples 104.

To guard against endwise movement of the valve in its casing, the former is provided with an annular groove 107 near one end and fitting in said groove is a divided washer 108 which also bears against the adjacent end of the valve casing, and to hold the washer in place a cap 109 is fitted over the end of the shaft and the divided washer and screws upon the end of the casing, and to lubricate the valve a grease cup 110 is carried by the cap 109. Mounted upon the other end of the valve casing and fitting upon the valve is a cap 111 containing packing 112 to bear against the valve and the adjacent end of the casing, any suitable means (not shown) being provided to lubricate the shaft at the last-named end of the valve casing.

On one extremity of the valve is a hand wheel 113 for convenience in turning the valve when the machine is not in operation, as for instance, when the hopper is being washed and it is desired to close the valve during such operation and then open it to effect the discharge of the water.

114 is a pair of collars rigidly secured to the valve and 115 a pair of collars journaled on the valve at the inner sides of collars 114, one of the collars 115 pivotally carrying a spring actuated pawl 116 and the other a spring actuated pawl 117, the latter facing in the reverse direction to the former but terminating in a tooth 118 for imparting rotation to the valve in the same direction, as hereinafter more particularly explained. The pawl 116 is adapted for engagement with diametrically opposite teeth of a ratchet wheel 119, and pawl 117 is adapted for successive engagement with diametrically opposite teeth of a ratchet wheel 120, the teeth of the last-named ratchet wheel being set at an angle of approximately thirty degrees behind the teeth of ratchet wheel 119.

The collar provided with pawl 116 is pivotally connected by a link 121 with crank arm 122 of a rock shaft 123, journaled in bearings 124, mounted on upstanding portions 125 of the machine frame, and secured at the inside of link 121 is a roller 126 fitting in a slot 127 of a link 128 pivotally connected to the collar carrying pawl 117, as shown most clearly in Fig. 13, and to hold the roller 126 at the lower end of slot 127, a latch 129 is pivoted at 130 to the link 128 and is held by the pressure of a spring 131 upon the roller 126, as shown clearly in Fig. 12, the arrangement being such that operation of the rock shaft 123 will effect simultaneous downward and upward movement of links 121 and 128 as long as the latch 129 is in operative position.

With the parts arranged as explained and as shown in Fig. 13, downward movement will result in pawl 116 turning the rotary valve 105 a quarter revolution, that is from a position in which its passages 106 are vertical to a position in which they are horizontal. The same operation causes pawl 117 to travel in the reverse direction to pawl 116 until, as the downward movements of the links end, the tooth of pawl 117 has passed a tooth of the ratchet wheel 120, so that as the rocking movement of shaft 123 is reversed and said links move upward, pawl 117 will move the valve another quarter revolution in the same direction, and pawl 116 will swing back to its initial position, where it is again ready to rotate the valve upon the next downward movement of the links, these actions continuing as long as the machine is in operation. To effect the rocking movement of shaft 123, it is provided with a pair of outwardly diverging crank arms 132 and 133 provided with antifriction rollers 134 and 135 at their free ends, and engaging the antifriction rollers of said crank arms 132 and 133 respectively are cams 136 and 137 mounted upon shafts 23 and 60 respectively. Cam 136 extends concentrically of its shaft 23 for approximately three-fifths of its circumference and between the extremities of its circumference it is formed with inwardly converging surfaces 138 and 139, the valve being opened as the portion 138 engages and operates crank arm

132 and closed as said rock arm is engaged by portion 139. As portion 138 is engaged by crank arm 132, the substantially radial surface 140 of cam 137 is in engagement with crank arm 133, and is forcing the same to the right and crank arm 132 in the same direction, this movement of the arms being effected by downward movement of the links 121 and 128. As cam 137 clears crank arm 133, portion 139 of cam 136 comes into engagement with crank arm 132 and reverses the rotation of the crank arms and hence of crank arm 122, and therefore effects upward movement of the links.

It will thus be seen that with each downward movement of crank arm 122 the valve is moved a quarter revolution, each upward movement of the crank arm effecting another quarter revolution of the valve. At the front or discharge end of the cake hopper 18 is a serrated guard 140, the serrations thereof being saw tooth in form and corresponding in number to the discharge passages of the valve, and underlying this guard is a reciprocatory cake placer constructed as follows: 141 is a transverse bar provided with grooved brackets 142 at its ends engaging the top marginal flanges of the machine frame, and provided with outwardly projecting bosses 143 for a purpose hereinafter explained. Hinged at 144 for slight vertical movement, to bar 141, is the top plate 145 of a serrated cake placing frame 146, the serrations of this frame lying in the same vertical plane as the valve openings and the serrations of the guard 140, and the free end of this reciprocatory cake placer rests slidingly on a plate 147, secured to the machine frame and extending from one side thereof to the other and terminating just above the rear edge of the conveyer lifting plate 47.

To effect reciprocatory action of this cake placer, links 148 are pivotally attached to the bosses 143, and to the upper ends of a pair of rock arms 149 secured on a rock shaft 150, journaled in bearings 151. Secured to this rock shaft is a crank arm 152 provided with a longitudinal slot 153 receiving the reduced end of a bolt 154 mounted in a sleeve 155, adjustable on a rod 156 secured to the collar 157 of an eccentric 158, mounted on shaft 60.

159 is a plate journaled on bolt 154 and clamped by said bolt between sleeve 155 and arm 152, through the action of a nut 160 engaging the threaded end of the bolt and said arm 152. If it is desired to adjust the plate 159 it can be accomplished by operating screw 161 extending through a lug of arm 152 and into a lug of plate 159, as shown clearly in Fig. 7. The sleeve 155 is held securely on eccentric rod 156 by a pin 162, and when it is desired to operate the machine without operating the cake placer, the pin 162 is withdrawn so as to leave the rod 156 free to reciprocate in sleeve 155, without imparting movement to the rock shaft 150 and hence to the placer.

By means of screw 161 the arm consisting of parts 152 and 159 can be lengthened or shortened imperceptibly to the eye, and therefore effect a fine adjustment in the travel of the cake placer, in order that cakes of different diameter may be accurately disposed by said placer centrally under the discharge nipples 104, it being noticed by reference to Fig. 5 that the cakes will be slid along on plate 147 and drop upon the upper run of conveyer 44, and in this connection it may be stated that a machine provided with more than four serrations in its cake placer will require two operators who will sit adjacent to hopper 18 and slide the cakes forwardly off the hopper onto the top plate of the placer. Upon the back movement of the placer the row of cakes will be drawn into the serrations of the guard 140 and as the placer becomes fully withdrawn, the cakes drop down upon the plate 147, so that the placer upon its next advance movement will catch a cake in each of its serrations, and slide it forward until the row of cakes are disposed directly under the discharge nipples, as indicated clearly in Figs. 4 and 5.

To insure the proper movement of the marshmallow in the hopper 67, it must be constantly agitated when the machine is in operation, and to accomplish this there are provided two rotary agitators each consisting preferably of a plurality of blades 163 and a shaft 164. The shafts are arranged at opposite sides of the feed plunger 74 and are journaled in and between the stationary bottom and hinged portions of the hopper 67, as shown clearly in Fig. 5, and keyed upon corresponding ends of said shafts 164 are intermeshing gear wheels 165, and meshing with one of said gear wheels is a gear pinion 166, journaled on a stub shaft 167 secured in any suitable manner to stationary bottom portion of the marshmallow hopper 67, and rigidly connected to pinion 166 is a sprocket wheel 168 connected by a chain 169 to a sprocket wheel 170, secured on shaft 23, the chain being kept tensioned by an ordinary wheel tensioner 171 adjustably mounted on the machine frame, as shown clearly in Fig. 2.

The operation of the machine is as follows: The hopper 67 is charged with a suitable quantity of marshmallow or icing of the requisite consistency, and a big pan of cakes is emptied into the cake hopper. Assuming that the clutch is in and the wheel 7 is belted up, the various parts which travel continuously in one direction, are operating as indicated by the adjacent arrows in the various figures. The parts are timed so that as a row of cakes are disposed by the placer under the nipples 104, the rotary valve is disposed with its openings 106 vertically and the same instant the plunger descends into the slot 72 and forces a charge of marshmallow out of said slot and through the valve casing and valve onto the cakes, which, at this instant, are raised by the arms 50 actuated as explained, for the purpose of effecting a spreading action of the marshmallow deposited thereon, it being understood that just previous to the descent of the said plunger—which is shown as descending in Fig. 5—two of the blades of the agitator force a quantity of marshmallow inwardly and in the path of downward movement of the plunger so that the latter shall expel a full predetermined charge with each descent.

As the cakes were dropped upon the conveyer, as above explained, the latter became stationary, and as the valve closes and the plunger starts upward on its return stroke, the lift plate 47 is lowered, which action effectively breaks any connection between the marshmallow on the cakes and that within the nipples, so that as the next intermittent step or travel of the conveyer occurs, to withdraw said cakes from under the nipples and dispose another row below the latter, it does not tend to drag the marshmallow on the cake back over the margin on the same and thus produce an unsightly or unevenly iced cake.

Should it be desired to stop the operation of the valve without interfering with the feed from the machine of the cakes at that time standing on the conveyer 44, the operator will operate latch 129 so as to permit roller 126 to operate up and down in slot 127 of link 128. By tripping this latch link 128 becomes inoperative and for this reason link 121 can perform no function because it requires the operation of pawl 117 as well as pawl 116, to effect operation of the ratchet wheels 119 and 120, and in this connection it will be apparent that when the latch is tripped, link 128 would tend to swing down under the valve 105, and to prevent its swinging too far in that direction, a stop 172 is secured to a boss or projection 173 of the machine frame, as shown clearly in Figs. 1 and 4.

The cake placer is made in two parts, one hinged for slight movement to the other to permit the hinged part to ride over an unyielding obstruction which may be in its path. It is desirable to throw the placer out of gear in the manner hereinbefore explained in connection with the description of the parts shown in Fig. 7, in the event it is desired to thoroughly sterilize and wash the hopper and the valve. During this washing operation it is preferred that the parts shall operate so that the washing operation shall be more thorough and after the operation the valve is opened by the operation of latch 129 to permit the water to escape into a suitable vessel or pan placed to receive it upon the conveyer.

The operation of starting and stopping the machine is, of course, performed through lever 15, as by said lever the clutch is thrown in and out of service.

From the above description it will be apparent that I have produced an icing machine by which icing, such as marshmallow, may be rapidly and uniformly placed upon the rows of cakes and which operates economically by depositing a predetermined quantity with each downward movement of the feed plunger. For fine variations in the quantity delivered with each down stroke of the plunger, the tension of spring 91 is varied by a proper adjustment of hand nut 93. For material variations in the charge the rod 87 will be adjusted lengthwise of rock arm 96, as hereinbefore explained.

It will be understood that I reserve the right to make all changes properly falling within the spirit and scope of the invention as outlined by the appended claims.

I claim:

1. In an icing machine, a hopper, a valve controlling discharge of icing from the hopper, means for effecting the discharge of a predetermined quantity of icing from the hopper when the valve is open, a cake conveyer under the valve, means for disposing a row of cakes under the valve to receive the icing discharged from the hopper, and means for effecting approaching movement between the discharge point of the hopper and said cakes to effect spreading of the icing upon the cakes as icing is being deposited thereon.

2. In an icing machine, a hopper, a valve controlling discharge of icing from the hopper, means for effecting the discharge of a predetermined quantity of icing from the hopper when the valve is open, a cake conveyer under the valve, means for disposing a row of cakes under the valve to receive the icing discharged from the hopper, and means for raising and lowering the cakes as the discharge of icing thereon takes place and ends respectively.

3. In an icing machine, a hopper, a valve controlling discharge of icing from the hopper, means for effecting the discharge of a predetermined quantity of icing from the hopper when the valve is open, an intermittently moving cake conveyer under the hopper, means for disposing a row of cakes upon said conveyer and under said valve in the interim between the movements of the conveyer, to receive the icing discharged from the hopper, and means for raising and lowering the row of cakes as the discharge of icing thereon occurs and ends respectively and during the interim between the conveyer movements.

4. In an icing machine, a hopper having a row of discharge points, an intermittently rotative valve having passages caused to alternatively move into and out of alinement with the discharge points of the hopper, means for effecting the discharge of a predetermined quantity of icing from the hopper when the valve is disposed with its passages in alinement with the discharge points of the hopper, means for supporting a row of cakes under the passages of said valve and holding them in such position as the discharge of icing from the hopper occurs, and means for effecting upward movement of the row of cakes as the discharge of icing from the hopper occurs.

5. In an icing machine, a hopper having a row of discharge points, an intermittently rotative valve having passages caused to alternatively move into and out of alinement with the discharge points of the hopper, means for effecting the discharge of a predetermined quantity of icing from the hopper when the valve is disposed with its passages in alinement with the discharge points of the hopper, means for supporting a row of cakes under the passages of said valve and holding them in such position as the discharge of icing from the hopper occurs, and means for effecting upward movement of the row of cakes as the discharge of icing from the hopper occurs and effecting downward movement of said row of cakes as the discharge of icing from the hopper stops.

6. In an icing machine, a hopper having a row of discharge points, a valve controlling the discharge of icing from the hopper at said points, a suitably guided reciprocatory plunger in the vertical plane of said row of points and within the hopper and adapted to move toward and from said points, a rock shaft mounted on the hopper and provided with arms connected to the plunger and an additional arm, a reciprocating rod, a sleeve slidable thereon and pivoted to said additional arm, means adjustably secured on the rod at opposite ends of the said sleeve, and a spring mounted on the rod and exerting force to hold the said sleeve against one of the said adjustable means and finding a resistance point against the other of said adjustable means.

7. In an icing machine, a hopper provided with a slot at its bottom, a valve casing secured to the hopper under said slot and provided with a row of discharge points, an intermittently rotating valve journaled in the casing and provided with passages for alternately opening and closing said discharge points, means for entering said slot and forcing icing therefrom through the valve casing and valve each time the latter opens, and a pair of rotating agitators in the hopper for forcing icing inwardly into the vertical plane of said plunger and slot.

8. In an icing machine, a hopper having a row of discharge points, a valve for alternately opening and closing said points, an intermittently movable conveyer under the valve, a plate overlying a part of the conveyer, a serrated guard overlying the plate and adapted to receive a row of cakes, a reciprocatory cake placer between the plate and guard and provided with serrations corresponding to those of the guard and adapted when at one end of its stroke to permit said row of cakes to drop onto the said plate and on its next advance to engage said cakes and slide them forwardly and eventually off the front end of said plate and onto the conveyer vertically below the valve, in the interim between movements thereof, and means to effect the discharge of icing from the hopper and valve onto said cakes while the conveyer is stationary.

9. In an icing machine, a hopper having a row of discharge points, a valve for alternately opening and closing said points, an intermittently movable conveyer under the valve, a plate overlying a part of the conveyer, a serrated guard underlying the plate and adapted to receive a row of cakes, a reciprocatory cake placer between the plate and guard and provided with serrations corresponding to those of the guard and adapted when at one end of its stroke to permit said row of cakes to drop onto the said plate and on its next advance to engage said cakes and slide them forwardly and eventually off the front end of said plate and onto the conveyer vertically below the valve, in the interim between movements thereof, means to effect the discharge of icing from the hopper and valve onto said cakes while the conveyer is stationary, and means to effect relative approaching and separating movement between the valve and the cakes while the conveyer is at rest.

10. In an icing machine, a hopper having a row of discharge points, a valve to alternately open and close said discharge points, an intermittently movable conveyer under the valve, a plate above the conveyer, a cake hopper above the plate from which a row of cakes is adapted to slide, a guard to receive the cakes from the hopper and to dispose them in longitudinal alinement with the discharge points of the hopper, a reciprocatory cake placer between said plate and guard and provided at its front edge with a saw toothed edge of which the notches lie in the same vertical longitudinal plane as the notches of the guard and the discharge points of the hopper, means to effect reciprocatory movement of said cake placer sufficient to permit cakes in the notches of the guard to drop down upon the said plate and on reverse movement to receive said cakes in its notches and slide them forwardly until they drop from the front end of said plate onto said conveyer when the latter is at rest and the valve is open, and means to effect discharge of icing from the hopper and valve onto said row of cakes before the next intermittent movement of the conveyer.

11. In an icing machine, a rotary valve, ratchet wheels thereon, collars pivoted on the shaft and provided with pawls to successively engage their respective ratchet wheels and intermittently turn the shaft in one direction, a link connected to one of said collars to operate the same, a link connected to the other collar to operate the same, means for normally compelling said links to move together, and means for permitting one of said links to drop down to an inoperative position without interfering with the regular movement of the other link and without becoming disconnected from the latter.

12. In an icing machine, a rotary valve, ratchet wheels thereon, collars pivoted on the shaft and provided with pawls to successively engage their respective ratchet wheels and intermittently turn the shaft in one direction, a link connected to one of said collars to operate the same, a link connected to the other collar to operate the same and having a pin-and-slot connection with the first-named link, and a spring actuated latch to compel the two links to move together.

In testimony whereof, I affix my signature, in the presence of two witnesses.

EDWARD LEGLER.

Witnesses:
BEN F. SHAMBAUGH,
G. Y. THORPE.